(12) United States Patent
Baumgart et al.

(10) Patent No.: US 8,147,923 B2
(45) Date of Patent: Apr. 3, 2012

(54) METHOD FOR PRODUCING COATINGS FROM COATING MATERIALS THAT CAN BE CURED BY THE ACTION OF HEAT OR ACTINIC RADIATION

(75) Inventors: Hubert Baumgart, Münster (DE); Karl-Heinz Joost, Drensteinfurt (DE); Uwe Meisenburg, Duisburg (DE)

(73) Assignee: BASF Coatings GmbH, Munster (DE)

( * ) Notice: Subject to any disclaimer, the term of this patent is extended or adjusted under 35 U.S.C. 154(b) by 1670 days.

(21) Appl. No.: 10/479,033

(22) PCT Filed: Jun. 18, 2002

(86) PCT No.: PCT/EP02/06698
§ 371 (c)(1),
(2), (4) Date: Nov. 26, 2003

(87) PCT Pub. No.: WO03/002268
PCT Pub. Date: Jan. 9, 2003

(65) Prior Publication Data
US 2004/0157003 A1 Aug. 12, 2004

(30) Foreign Application Priority Data
Jun. 27, 2001 (DE) .................................. 101 30 972

(51) Int. Cl.
B05D 7/26 (2006.01)
B05D 3/02 (2006.01)
B05D 3/06 (2006.01)
C08F 2/48 (2006.01)
B05D 7/16 (2006.01)

(52) U.S. Cl. ...................... 427/495; 427/508; 427/407.1

(58) Field of Classification Search .................. 427/487, 427/492, 493, 495, 496, 500, 508, 514, 521, 427/522, 541, 542, 545, 551, 553, 557, 592, 427/595, 407.1, 409, 410
See application file for complete search history.

(56) References Cited

U.S. PATENT DOCUMENTS

| | | | |
|---|---|---|---|
| 3,798,053 A * | 3/1974 | Huemmer | 427/495 |
| 3,974,303 A | 8/1976 | Iwase et al. | |
| 4,064,161 A | 12/1977 | Lewis et al. | |
| 4,129,488 A | 12/1978 | McGinniss | |
| 4,163,810 A | 8/1979 | McGinniss | |
| 4,164,689 A | 8/1979 | Zappala | |
| 4,208,313 A | 6/1980 | Lewis et al. | |
| 4,268,542 A | 5/1981 | Sakakibara et al. | |
| 4,375,498 A | 3/1983 | Le Minez et al. | |
| 4,424,252 A | 1/1984 | Nativi | |
| 4,450,200 A | 5/1984 | Iwato et al. | |
| 4,537,926 A | 8/1985 | Kivel et al. | |
| 4,634,602 A | 1/1987 | Sirkoch et al. | |
| 4,675,234 A | 6/1987 | Sachs et al. | |
| 4,754,014 A | 6/1988 | Ryntz et al. | |
| 4,761,212 A | 8/1988 | Watanabe et al. | |
| 5,356,669 A | 10/1994 | Rehfuss et al. | |
| 5,425,970 A | 6/1995 | Lahrmann et al. | 427/493 |
| 5,474,811 A | 12/1995 | Rehfuss et al. | |
| 5,605,965 A | 2/1997 | Rehfuss et al. | |
| 5,824,373 A | 10/1998 | Biller et al. | |
| 6,332,291 B1 | 12/2001 | Flosbach et al. | 52/91 |
| 6,344,501 B1 | 2/2002 | Sierakowski et al. | |

FOREIGN PATENT DOCUMENTS

| | | | |
|---|---|---|---|
| AU | 772458 | * | 1/2001 |
| DE | 2003579 A1 | | 7/1970 |
| DE | 1958392 A1 | | 2/1971 |
| DE | 2436186 A1 | | 3/1975 |
| DE | 2848906 A1 | | 5/1979 |
| DE | 3316593 A1 | | 11/1984 |
| DE | 3407087 A1 | | 9/1985 |
| DE | 3828098 A1 | | 3/1990 |
| DE | 3836370 A1 | | 5/1990 |
| DE | 4011045 A1 | | 10/1991 |
| DE | 4020316 A1 | | 1/1992 |
| DE | 4025215 A1 | | 2/1992 |
| DE | 4122743 C1 | | 11/1992 |
| DE | 4125459 A1 | | 2/1993 |
| DE | 4203278 A1 | | 8/1993 |
| DE | 4204518 A1 | | 8/1993 |
| DE | 4215070 | | 11/1993 |
| DE | 4222194 A1 | | 1/1994 |
| DE | 4235778 A1 | | 4/1994 |
| DE | 3706095 C2 | | 5/1994 |

(Continued)

OTHER PUBLICATIONS

Machine translation of WO 01/91920 A2.*

(Continued)

Primary Examiner — William Phillip Fletcher, III
(74) Attorney, Agent, or Firm — Cantor Colburn LLP

(57) ABSTRACT

A process comprising applying coating materials to substrates, and curing the coating materials thermally and with actinic radiation, alone or together with optional coating films already present on the substrate. The actinic radiation cure is conducted under an oxygen-depleted atmosphere. The coating materials comprise (meth)acrylate copolymers having an OH number from 100 to 220 mg KOH/g, Tg of −35 to +60° C., number-average MW of from 1,000 to 10,000 daltons and a mass-average MW of from 2,000 to 40,000 daltons and contain in copolymerized form an amount of hydroxyl-containing monomers (a) that corresponds to the OH number, of which (a1) from 20 to 90% by weight are based on (a), 4-hydroxybutyl(meth)acrylate and/or 2-alkylpropane-1,3-diol mono(meth)acrylate, and (a2) from 10 to 80% by weight are based on (a), other hydroxyl-containing olefinically unsaturated monomers. The process further comprises from 0.2 to 8% by weight of photoinitiators.

10 Claims, No Drawings

FOREIGN PATENT DOCUMENTS

| | | |
|---|---|---|
| DE | 4303570 A1 | 8/1994 |
| DE | 4328092 A1 | 2/1995 |
| DE | 4337961 A1 | 5/1995 |
| DE | 4421823 A1 | 1/1996 |
| DE | 4438504 A1 | 5/1996 |
| DE | 19512017 C1 | 7/1996 |
| DE | 19613547 A1 | 11/1996 |
| DE | 19524182 A1 | 1/1997 |
| DE | 19540977 A1 | 5/1997 |
| DE | 19617086 A1 | 10/1997 |
| DE | 19709476 A1 | 11/1997 |
| DE | 19628142 A1 | 1/1998 |
| DE | 19628143 A1 | 1/1998 |
| DE | 3807571 C3 | 6/1998 |
| DE | 19652813 A1 | 6/1998 |
| DE | 19709465 A1 | 9/1998 |
| DE | 19709467 C1 | 10/1998 |
| DE | 19818735 | 10/1999 |
| DE | 19828742 A1 | 12/1999 |
| DE | 19850243 A1 | 5/2000 |
| DE | 19855125 A1 | 5/2000 |
| DE | 19904317 A1 | 8/2000 |
| DE | 19908018 A1 | 8/2000 |
| DE | 19914896 A1 | 10/2000 |
| DE | 19920799 | 11/2000 |
| DE | 19924171 A1 | 11/2000 |
| DE | 19924674 | 11/2000 |
| DE | 19930067 | 1/2001 |
| DE | 19930664 | 1/2001 |
| DE | 19930665 | 1/2001 |
| DE | 10027268 | 12/2001 |
| DE | 4126476 C9 | 10/2004 |
| EP | 0002866 A1 | 7/1979 |
| EP | 0054505 A1 | 6/1982 |
| EP | 0089497 A3 | 9/1983 |
| EP | 0074634 B1 | 2/1986 |
| EP | 0228003 A1 | 7/1987 |
| EP | 0234361 A1 | 9/1987 |
| EP | 0234362 A1 | 9/1987 |
| EP | 0256540 A3 | 2/1988 |
| EP | 0260447 A3 | 3/1988 |
| EP | 0297576 A1 | 1/1989 |
| EP | 0299148 A3 | 1/1989 |
| EP | 0354261 A1 | 2/1990 |
| EP | 0394737 A1 | 10/1990 |
| EP | 0401565 A1 | 12/1990 |
| EP | 0410242 A3 | 1/1991 |
| EP | 0424705 A2 | 5/1991 |
| EP | 0522419 A1 | 1/1993 |
| EP | 0522420 A2 | 1/1993 |
| EP | 0523610 A1 | 1/1993 |
| EP | 0536712 A2 | 4/1993 |
| EP | 0540884 A1 | 5/1993 |
| EP | 0554783 A1 | 8/1993 |
| EP | 0568967 A3 | 11/1993 |
| EP | 0358153 B1 | 1/1994 |
| EP | 0581211 A1 | 2/1994 |
| EP | 0584818 A1 | 3/1994 |
| EP | 0590484 A1 | 4/1994 |
| EP | 0594068 A1 | 4/1994 |
| EP | 0594071 A1 | 4/1994 |
| EP | 0594142 A1 | 4/1994 |
| EP | 0596460 A2 | 5/1994 |
| EP | 0596461 A2 | 5/1994 |
| EP | 0604992 A1 | 7/1994 |
| EP | 0521928 B1 | 8/1994 |
| EP | 0397806 B1 | 9/1994 |
| EP | 0505445 B1 | 11/1994 |
| EP | 0634431 A1 | 1/1995 |
| EP | 0636669 A3 | 2/1995 |
| EP | 0649865 A1 | 4/1995 |
| EP | 0650978 A1 | 5/1995 |
| EP | 0650979 A1 | 5/1995 |
| EP | 0650985 A1 | 5/1995 |
| EP | 0669356 A1 | 8/1995 |
| EP | 0192113 B1 | 10/1995 |
| EP | 0529335 B1 | 10/1995 |
| EP | 0678536 A1 | 10/1995 |
| EP | 0543817 B1 | 2/1996 |
| EP | 0593454 B1 | 5/1997 |
| EP | 0639660 B1 | 5/1997 |
| EP | 0646420 B1 | 11/1997 |
| EP | 0574417 B1 | 4/1998 |
| EP | 0844286 A1 | 5/1998 |
| EP | 0783534 B1 | 9/1998 |
| EP | 0531510 B1 | 6/1999 |
| EP | 0928800 A1 | 7/1999 |
| EP | 0817684 B1 | 11/1999 |
| EP | 0708788 B1 | 1/2000 |
| EP | 0595186 B2 | 4/2003 |
| EP | 0817648 B1 | 12/2004 |
| JP | 50142501 A | 11/1975 |
| JP | 5265534 A | 5/1977 |
| WO | WO8202387 A1 | 7/1982 |
| WO | WO8910387 A2 | 11/1989 |
| WO | WO9222615 A1 | 12/1992 |
| WO | WO9410211 A1 | 5/1994 |
| WO | WO9410212 A1 | 5/1994 |
| WO | WO9410213 A1 | 5/1994 |
| WO | WO9422969 A1 | 10/1994 |
| WO | WO9426827 A1 | 11/1994 |
| WO | WO9514721 A1 | 6/1995 |
| WO | WO9527742 A1 | 10/1995 |
| WO | WO9612747 A1 | 5/1996 |
| WO | WO9746549 A1 | 12/1997 |
| WO | WO9749745 A1 | 12/1997 |
| WO | WO9749747 A1 | 12/1997 |
| WO | WO9802466 A1 | 1/1998 |
| WO | WO9807794 A1 | 2/1998 |
| WO | WO9914254 A1 | 3/1999 |
| WO | WO 01/91920 A1 * | 12/2001 |
| WO | WO 03/002268 A3 * | 1/2003 |

OTHER PUBLICATIONS

Meiseuburg, et al., U.S. Appl. No. 09/926,532, filed Nov. 16, 2001.
Wegner, et al., U.S. Appl. No. 10/018,106, filed Oct. 30, 2001.
Bremser, U.S. Appl. No. 10/018,351, filed Dec. 7, 2001.
Bremser, U.S. Appl. No. 10/018,352, filed Dec. 7, 2001.
Bremser, U.S. Appl. No. 10/018,703, filed Dec. 13, 2001.
English language abstract for DE10027268 from EPO, Dec. 13, 2001.
International Preliminary Examination Report for International Application No. PCT/EP2002/006698 dated Mar. 25, 2004.

* cited by examiner

METHOD FOR PRODUCING COATINGS FROM COATING MATERIALS THAT CAN BE CURED BY THE ACTION OF HEAT OR ACTINIC RADIATION

The present invention relates to a novel process for producing coatings, especially clearcoats and multicoat color and/or effect paint systems, from coating materials curable thermally and with actinic radiation. The present invention also relates to coatings, especially clearcoats and multicoat color and/or effect paint systems, producible from coating materials curable thermally and with actinic radiation. The present invention additionally relates to the use of the novel process and of the novel coatings for the finishing of motor vehicle bodies and parts thereof, the interior and exterior of motor vehicles, buildings inside and out, doors, windows, and furniture, and for coating in the context of the industrial coating of small parts, coils, containers, packaging, electrical components, and white goods.

By actinic radiation, here and below, is meant electromagnetic radiation, such as near infrared, visible light, UV radiation or X-rays, especially UV radiation, and corpuscular radiation, such as electron beams.

Combined curing by means of heat and actinic radiation is also referred to by those in the art as dual cure.

Accordingly, here and below, the coating materials in question are referred to as dual-cure coating materials.

Dual-cure coating materials and processes and apparatus for their curing with actinic radiation, especially UV radiation, are known from the German patent application DE 198 18 735 A1, column 10 line 31 to column 11 line 16. The use of inert gas is not envisaged.

Dual-cure coating materials are also known from the German patent applications DE 42 15 070 A1, DE 199 30 665 A1, DE 199 30 067 A1, DE 199 30 664 A1, DE 199 24 674 A1 and DE 199 20 799 A1. They are used to produce coatings, especially clearcoats and multicoat color and/or effect paint systems. The actinic radiation cure is conducted in particular using UV radiation. There is a general recommendation to carry out irradiation under inert gas in order to prevent the formation of ozone. On the other hand, the formation of ozone is not regarded as a grave problem, because the gas can be removed by suction (cf. DE 42 15 070 A1, page 3 lines 42 and 43). The possibility of purposively setting and improving the performance properties of the coatings by way of the composition first of the gas atmosphere and secondly of the dual-cure coating materials is not evident from the patent applications.

The German patent application DE 100 27 268.1, unpublished at the priority date of the present specification, describes a process for producing a multicoat clearcoat system on a primed or unprimed substrate by
(I) applying at least one first clearcoat material to the primed or unprimed substrate,
(II) drying the resultant first clearcoat film(s), without curing it(them), or—alternatively —curing the first clearcoat film (s),
(III) applying at least one second clearcoat material, materially different from the first clearcoat material, and
(IV) conjointly curing the first and second clearcoat film(s) or—alternatively—curing the second clearcoat film(s) alone,
wherein the second clearcoat materials comprise as binder(s)
(A) at least one (meth)acrylate copolymer which is free from siloxane groups and contains, based on the siloxane-group-free (meth)acrylate copolymer (A), up to 90% by weight of hydroxyl-containing olefinically unsaturated monomers
(a) in copolymerized form, of which
(a1) from 10 to 90% by weight, based on the siloxane-group-free (meth)acrylate copolymer (A), are 4-hydroxybutyl (meth)acrylate and/or 2-alkylpropane-1,3-diol mono(meth)-acrylate and
(a2) from 0 to 45% by weight, based on the siloxane-group-free (meth)acrylate copolymer (A), are other hydroxyl-containing olefinically unsaturated monomers;
and as crosslinking agent(s)
(B) at least one tris(alkoxycarbonylamino)triazine,
the first and the second clearcoat materials containing no tricyclodecanedimethanol (TCD).

Also described is a process for producing a multicoat color and/or effect paint system on a primed or unprimed substrate by
(I) applying at least one color and/or effect coating material to the primed or unprimed substrate,
(II) drying the resultant color and/or effect coating film, without curing it, or—alternatively —curing the color and/or effect coating film, to give the color and/or effect coating,
(III) applying at least one first clearcoat material, to the color and/or effect coating film or coating,
(IV) drying the first clearcoat film(s), without curing it(them), or—alternatively—curing the first clearcoat film(s) alone or together with the color and/or effect coating film,
(V) applying at least one second clearcoat material, materially different from the first clearcoat material, to the first clearcoat film or to the first clearcoat, and
(VI) curing the second clearcoat film(s) alone, together with the first clearcoat film(s) or together with the color and/or effect coating film and with the first clearcoat film(s), to give the multicoat color and/or effect paint system,
wherein the second clearcoat materials likewise comprise as binder(s)
(A) at least one (meth)acrylate copolymer which is free from siloxane groups and contains, based on the siloxane-group-free (meth)acrylate copolymer (A), up to 90% by weight of hydroxyl-containing olefinically unsaturated monomers
(a) in copolymerized form, of which
(a1) from 10 to 90% by weight, based on the siloxane-group-free (meth)acrylate copolymer (A), are 4-hydroxybutyl (meth)acrylate and/or 2-alkylpropane-1,3-diol mono(meth)acrylate and
(a2) from 0 to 45% by weight, based on the siloxane-group-free (meth)acrylate copolymer (A), are other hydroxyl-containing olefinically unsaturated monomers;
and as crosslinking agent(s)
(B) at least one tris(alkoxycarbonylamino)triazine,
the first and the second clearcoat materials containing no tricyclodecanedimethanol (TCD).

Preferably, the (meth)acrylate copolymer (A) of the second clearcoat material has
an OH number of from 130 to 200, more preferably from 135 to 190, more preferably still from 140 to 185, and in particular from 145 to 180 mg KOH/g,
a glass transition temperature of from −35 to +60° C., in particular from −20 to +40° C.,
a number-average molecular weight of from 1 000 to 5 000 daltons, in particular from 2 000 to 4 500 daltons, and
a mass-average molecular weight of from 2 000 to 20 000 daltons, in particular from 4 000 to 16 000 daltons.

The second clearcoat material may also be a dual-cure clearcoat material which can be crosslinked with UV radiation under inert gas. For the actinic radiation cure it is preferred to employ a dose of from 1 000 to 3 000 mJ/cm². The purposive influencing and improvement of the performance properties of the second clearcoats by way of the composition of the gas phase in the course of the UV cure is not described.

It is an object of the present invention to find a novel process for producing coatings from coating materials curable thermally and with actinic radiation, especially UV radiation, that provides coatings which are highly scratch-resistant, chemical-resistant, yellowing-resistant, stable to overbake, and stable in shade even following sunlight exposure and storage in the dark.

The invention accordingly provides the novel process for producing coatings from coating materials curable thermally and with actinic radiation, in which
(I) the coating materials are applied to primed or unprimed substrates or to uncured, part-cured and/or fully cured coating films present on said substrates, and
(II) the resulting films of the coating materials are cured thermally and with actinic radiation, alone or together with the uncured and/or part-cured coating films,
which involves
(1) conducting the actinic radiation cure under an oxygen-depleted atmosphere and
(2) the coating materials comprising
  (A) at least one binder selected from the group consisting of meth(acrylate) copolymers which have an OH number of from 100 to 220 mg KOH/G, a glass transition temperature of −35 to +60° C., a number-average molecular weight of from 1 000 to 10 000 daltons and a mass-average molecular weight of from 2 000 to 40 000 daltons and which contain in copolymerized form an amount of hydroxyl-containing olefinically unsaturated monomers (a) that corresponds to the OH number, of which
    (a1) from 20 to 90% by weight, based on the hydroxyl-containing monomers (a), are selected from the group consisting of 4-hydroxybutyl (meth)acrylate and/or 2-alkylpropane-1,3-diol mono(meth)acrylate, and
    (a2) from 10 to 80% by weight, based on the hydroxyl-containing monomers (a), are selected from the group consisting of other hydroxyl-containing olefinically unsaturated monomers;
  and
  (B) from 0.2 to 8% by weight, based on the solids of the coating material, of at least one photoinitiator.

In the text below, the novel process for producing coatings from coating materials curable thermally and with actinic radiation is referred to as the "process of the invention".

Further subject matter of the invention will emerge from the description.

In the light of the prior art it was surprising and unforeseeable for the skilled worker that the object on which the present invention was based could be achieved by means of the process of the invention. A particular surprise was that the use of an oxygen-depleted atmosphere in the course of the actinic radiation cure, especially the UV cure, of dual-cure coating materials was able to bring about a significant improvement in the scratch resistance, hardness, chemical stability, yellowing resistance, overbake stability, and shade stability of the coatings of the invention in comparison to coatings which had been produced in air. Most surprising, however, was that the coatings of the invention produced by the process of the invention were highly scratch-resistant and hard, since these two properties are often mutually contradictory, i.e., high scratch resistance often presupposes a comparatively low hardness or else high hardness leads to a comparatively low scratch resistance.

The process of the invention is employed in particular in automobile finishing for the original finishing of bodies and parts thereof and the refinish of the interior and exterior of motor vehicles, in the coating of buildings inside and out, in the coating of furniture, doors and windows, and in industrial coating, including coil coating, container coating, the impregnation of electrical components, such as wound goods, and the coating of small parts, such as nuts, bolts, wheel rims or hubcaps, and white goods, such as radiators, domestic appliances, refrigerator exteriors or washing machine exteriors.

The process of the invention therefore starts from primed or unprimed substrates of metal, plastic, glass, wood, textile, leather, natural and artificial stone, concrete, cement or composites of these materials, such as are commonly used in the technical fields referred to above, with preference being given to the electrically conductive substrates.

In the case of plastics, customary and known primer coats or tie coats may be employed, or the surfaces of the plastic may have been given a firm-adhesion finish by flaming or etching with reactive compounds such as fluorine.

In the case of electrically conductive substrates, especially metals, the primers used may be those as described in Römpp Lexikon Lacke und Druckfarben, Georg Thieme Verlag, Stuttgart, N.Y., 1988, "primers", page 473, "wash primers", page 618, or "shop primers", page 230.

In the case of substrates based on iron, primers may be used which are produced in a customary and known manner from electrodeposition coating (electrocoat material).

Both anodic and cathodic electrocoat materials are suitable for this purpose, but particularly cathodics.

The cured electrocoat or the uncured or part-cured electrocoat film may be overcoated with a primer-surfacer, which is cured either alone or together with the electrocoat film (wet-on-wet technique). Over-coating with a primer-surfacer is done in particular in those areas which are subjected to severe mechanical stress, such as by stone chipping, for example.

Examples of suitable cathodic electrocoat materials and, where appropriate, of wet-on-wet techniques are described in the Japanese patent application 1975-142501 (Japanese laid-open specification JP 52-065534 A2, chemical abstracts No. 87: 137427) or in the patents and patent applications U.S. Pat. Nos. 4,375,498 A1, 4,537,926 A1, 4,761,212 A1, EP 0 529 335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 and WO 98/07794.

Similarly, suitable primer-surfacers, especially aqueous primer-surfacers, which are also referred to as antistonechip primer coats or functional coats, are known from the patents and patent applications U.S. Pat. No. 4,537,926 A1, EP 0 529 335 A1, EP 0 595 186 A1, EP 0 639 660 A1, DE 44 38 504 A1, DE 43 37 961 A1, WO 89/10387, U.S. Pat. Nos. 4,450,200 A1, 4,614,683 A1 and WO 94/26827, It is a particular advantage of the process of the invention that the primer-surfacer coats or anti-stonechip primer coats may also be produced by means of the process of the invention from the dual-cure coating materials described below and intended for use in accordance with the invention.

In the context of the process of the invention, the primer-surfacer films applied to the electrocoat may also be cured together with at least one further coating film present thereon.

In the case of electrically conductive substrates based on aluminum, the primer coat used is preferably an aluminum oxide layer produced by anodic oxidation.

The process of the invention may be performed in any of a wide variety of variants. The decision as to which particular variant to employ is guided by the requirements of the technical field in question, by the available coating plant, and by the structure and the functions that the coatings or paint systems of the invention are intended to have.

In a first preferred variant of the process of the invention, the dual-cure coating materials described below, for use in accordance with the invention, are applied to the above-described substrates and are cured alone. The dual-cure coating materials for use in accordance with the invention may comprise dual-cure clearcoat materials or pigmented dual-cure coating materials, such as primer-surfacers or basecoats. Preferably they are dual-cure clearcoat materials. This first preferred variant results in single-coat clearcoats or single-coat color and/or effect, electrically conductive, magnetically shielding or fluorescent paint systems.

In a second preferred variant in the process of the invention, the dual-cure coating materials for use in accordance with the invention are applied to existing, cured coats present on the substrates. These cured coats or paint systems may comprise the above-described primer-surfacer coats or antistonechip primer coats, or may comprise customary and known basecoats and/or clearcoats.

The basecoats can be produced from customary and known basecoat materials, such as those known from the patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 and EP 0 817 684, column 5 lines 31 to 45.

The clearcoats are producible from customary and known clearcoat materials, such as are known from the patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/10213, WO 94/22969 and WO 92/22615, U.S. Pat. Nos. 5,474,811 A1, 5,356,669 A1 and 5,605,965 A1, DE 42 22 194 A1, BASF Lacke+Farben AG product information "Pulverlacke" [powder coating materials], 1990, BASF Coatings AG company brochure "Pulverlacke, Pulverlacke für industrielle Anwendungen" [powder coating materials, powder coatings for industrial applications], January 2000, U.S. Pat. No. 4,268,542 A1, DE 195 40 977 A1, DE 195 18 392 A1, DE 196 17 086 A1, DE-A-196 13 547, DE 196 52 813 A1, DE-A-198 14 471 A1, EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1, EP 0 002 866 A1, DE 197 09 467 A1, DE 42 03 278 A1, DE 33 16 593 A1, DE 38 36 370 A1, DE 24 36 186 A1, DE 20 03 579 B1, WO 97/46549, WO 99/14254, U.S. Pat. Nos. 5,824,373 A1, 4,675,234 A1, 4,634,602 A1, 4,424,252 A1, 4,208,313 A1, 4,163,810 A1, 4,129,488 A1, 4,064,161 A1, 3,974,303 A1, EP 0 844 286 A1, DE 43 03 570 A1, DE 34 07 087 A1, DE 40 11 045 A1, DE 40 25 215 A1, DE 38 28 098 A1, DE 40 20 316 A1 and DE 41 22 743 A1.

Alternatively, the basecoats and the clearcoats may have been produced by the process of the invention from the coating materials for use in accordance with the invention.

Prior to the application of the dual-cure coating materials for use in accordance with the invention, the surface of the coat may be treated physically and/or chemically. Physical treatment may comprise exposure to actinic radiation, treatment with ultrasound and/or heat, and/or mechanical treatment, by sanding, polishing or buffing, and the chemical treatment may comprise etching with suitable chemicals such as acids or bases and/or flaming.

In this second preferred variant, the films of the dual-cure coating materials for use in accordance with the invention are cured alone.

In a third preferred variant of the process of the invention, the dual-cure coating materials for use in accordance with the invention are applied to part-cured or uncured coating films present on the substrates (wet-on-wet technique). These coating films may comprise primer-surfacer films, basecoat films or clearcoat films and may consist of the above-described primer-surfacers, basecoat materials or clearcoat materials or of the dual-cure coating materials for use in accordance with the invention. The resulting films of the dual-cure coating materials for use in accordance with the invention are then cured together with the underlying coating film or films.

The second and the third preferred variant of the process of the invention result in multicoat clearcoat systems or multicoat color and/or effect, electrically conductive, magnetically shielding or fluorescent paint systems.

In terms of its method, the application of the dual-cure coating materials for use in the process of the invention has no special features but may instead take place by any customary and known application methods suitable for the coating material in question, such as electrodeposition coating, spraying, knife coating, brushing, flow coating, dipping, trickling-or rolling, for example. Preference is given to employing spray application methods, such as compressed air spraying, airless spraying, high-speed rotation, electrostatic spray application (ESTA), alone or in conjunction with hot spray application such as hot air spraying, for example, except where the coating materials in question are powder coating materials.

The application of the powder coating materials also has no special features in terms of its method but instead takes place, for example, by the customary and known fluidized bed techniques, such as are known, for example, from the BASF Coatings AG company brochures "Pulverlacke fü industrielle Anwendungen" [powder coating materials for industrial applications], January 2000, or "Coatings Partner, Pulverlack Spezial" [coatings partner, powder coatings special], 1/2000, or Römpp Lexikon Lacke und Druckfarben, Georg Thieme Verlag, Stuttgart, N.Y., 1998, pages 187 and 188, "electrostatic powder spraying", "electrostatic spraying", and "electrostatic fluidized bath process".

In a course of application it is advisable to operate in the absence of actinic radiation in order to prevent premature crosslinking of the dual-cure coating materials for use in accordance with the invention.

The curing of the dual-cure coating materials employed in the process of the invention generally takes place after a certain rest time or flashoff time. This may have a duration of 30 s to 2 h, preferably from 1 min to 1 h, and in particular from 1 min to 45 min. The rest period is used, for example, for leveling and devolatilization of the coating films and for the evaporation of volatile constituents such as any solvent and/or water present. Flashing off may be accelerated by an increased temperature, but one less than that sufficient for curing, and/or by a reduced atmospheric humidity.

In the context of the process of the invention, this measure is also employed for the drying of applied coating films which are not to be cured or are to be only part-cured.

The thermal cure takes place, for example, with the aid of a gaseous, liquid and/or solid, hot medium, such as hot air, heated oil or heated rollers, or of microwave radiation, infrared light and/or near infrared (NIR) light. Heating preferably takes place in a forced air oven or by exposure to IR and/or NIR lamps. As in the case of the actinic radiation cure, the thermal cure may also take place in stages. Advantageously, the thermal cure takes place at temperatures from room temperature up to 200° C.

In the actinic radiation cure it is preferred to employ a dose of from 500 to 4 000, more preferably from 1 000 to 2 900, with particular preference from 1 200 to 2 800, with very particular preference from 1 300 to 2 700, and in particular from 1 400 to 2 600 mJ/cm$^2$.

The actinic radiation cure is carried out using the customary and known radiation sources and optical auxiliary measures. Examples of suitable radiation sources are flash lamps from the company VISIT, high-pressure or low-pressure mercury vapor lamps, with or without lead doping in order to open up a radiation window of up to 405 nm, or electron beam sources. Their arrangement is known in principle and may be adapted to the circumstances of the workpiece and the process parameters. In the case of workpieces of complex shape, such as those envisaged for automobile bodies, those areas which are not accessible to direct radiation (shadow areas), such as cavities, folds and other structural undercuts, may be cured using pointwise, small-area or all-round emitters, in conjunction with an automatic movement means for the irradiation of cavities or edges.

The equipment and conditions for these curing methods are described, for example, in R. Holmes, U.V. and E.B. Curing formulations for printing inks, coatings and paints, SITA Technology, Academic Press, London, United Kingdom 1984, or in the German patent application DE 198 18 735 A1, column 10 line 31 to column 11 line 16.

Curing here may take place in stages, i.e., by multiple exposure to light or actinic radiation. It may also be carried out alternatingly, i.e., by curing alternately with UV radiation and electron beams, for example.

The thermal cure and actinic radiation cure may be employed simultaneously or in succession. Where the two methods of curing are employed in succession, it is possible, for example, to commence with the thermal cure and to end with the actinic radiation cure. In other cases it may prove advantageous to begin and to end with the actinic radiation cure.

In accordance with the invention, curing with actinic radiation is carried out under an oxygen-depleted atmosphere.

"Oxygen-depleted" means that the oxygen content of the atmosphere is less than the oxygen content of air (20.95% by volume). The maximum content in the oxygen-depleted atmosphere is preferably 18%, or preferably 16%, with particular preference 14%, with very particular preference 10%, and in particular 6.0% by volume.

The atmosphere in principle may be oxygen-free. Owing to the absence of the inhibitory effect of oxygen, however, this may bring about a sharp acceleration in the radiation cure, as a result of which inhomogeneities and stresses may arise in the coatings of the invention. It is therefore of advantage not to lower the oxygen content of the atmosphere to zero % by volume.

The minimum oxygen content is preferably 0.1%, more preferably 0.5%, with particular preference 1.0%, with very particular preference 1.5%, and in particular 2.0% by volume.

The oxygen-depleted atmosphere may be provided in a variety of ways. For example, an appropriate gas mixture may be prepared and made available in pressure bottles. The depletion is preferably achieved by introducing at least one inert gas in the requisite amounts into the air cushion located above the surface of the films that are to be cured. The oxygen content of the atmosphere located over the surface in question may be measured continuously with the aid of customary and known methods and equipment for determining elemental oxygen and may, where appropriate, be adjusted automatically to the desired level.

By inert gas is meant a gas which under the curing conditions employed is not decomposed by the actinic radiation, does not inhibit curing, and/or does not react with the dual-cure coating material for use in accordance with the invention. Preference is given to using nitrogen, carbon dioxide, helium, neon or argon, especially nitrogen and/or carbon dioxide.

The coating material for use in accordance with the invention comprises at least one, especially one, (meth)acrylate copolymer (A) as binder. In some cases, however, it may be advantageous to use at least two, especially two (meth)acrylate copolymers (A) which have a different profile of properties in terms of the essential ranges of OH number, glass transition temperature, and number-average and mass-average molecular weight that are indicated below.

The (meth)acrylate copolymer (A) has
  an OH number of from 100 to 220, preferably from 130 to 200, more preferably from 140 to 190, and in particular from 145 to 180 mg KOH/g,
  a glass transition temperature of from −35 to +60° C., in particular from −25 to +40° C.,
  a number-average molecular weight of from 1 000 to 10 000 daltons, in particular from 1 500 to 5 000 daltons, and
  a mass-average molecular weight of from 2 000 to 40 000 daltons, in particular from 3 000 to 20 000 daltons.

The (meth)acrylate copolymer (A) contains an amount corresponding to its OH number of hydroxyl-containing olefinically unsaturated monomers (a) in copolymerized form, of which (a1) from 20 to 90%, preferably from 22 to 85%, more preferably from 25 to 80%, and in particular from 28 to 75% by weight, based in each case on the hydroxyl-containing monomers (a), are selected from the group consisting of 4-hydroxybutyl (meth)acrylate and 2-alkylpropane-1,3-diol mono(meth)acrylates, and (a2) from 20 to 80%, preferably from 15 to 78%, more preferably from 20 to 75%, and in particular from 25 to 72% by weight, based in each case on the hydroxyl-containing monomers (a), are selected from the group consisting of other hydroxyl-containing olefinically unsaturated monomers.

Examples of suitable 2-alkylpropane-1,3-diol mono(meth)acrylates (a1) are 2-methyl-, 2-ethyl-, 2-propyl-, 2-isopropyl- or 2-n-butylpropane-1,3-diol mono(meth)acrylate, of which 2-methylpropane-1,3-diol mono(meth)acrylate is particularly advantageous and is used with preference.

Examples of suitable other hydroxyl-containing olefinically unsaturated monomers (a2) are hydroxyalkyl esters of olefinically unsaturated carboxylic, sulfonic and phosphonic acids and acidic phosphoric and sulfuric esters, especially carboxylic acids, such as acrylic acid, beta-carboxyethyl acrylate, methacrylic acid, ethacrylic acid and crotonic acid, particularly acrylic acid and methacrylic acid. They are derived from an alkylene glycol, which is esterified with the acid, or are obtainable by reacting the acid with an alkylene oxide such as ethylene oxide or propylene oxide. It is preferred to use the hydroxyalkyl esters in which the hydroxyalkyl group contains up to 20 carbon atoms, particularly 2-hydroxyethyl or 3-hydroxypropyl acrylate or methacrylate; 1,4-bis(hydroxymethyl)cyclohexane or octahydro-4,7-methano-1H-indenedimethanol monoacrylate or monomethacrylate; or reaction products of cyclic esters, such as epsilon-caprolactone, for example, and these hydroxyalkyl esters; or olefinically unsaturated alcohols such as allyl alcohol; or polyols, such as trimethylolpropane monoallyl or diallyl ether or pentaerythritol monoallyl, diallyl or triallyl ether.

These monomers (a2) of relatively high functionality are generally used only in minor amounts. In the context of the present invention, minor amounts of monomers (a2) of relatively high functionality are amounts which do not lead to crosslinking or gelling of the (meth)acrylate copolymers (A), unless the intention is that they should be in the form of crosslinked micro-gel particles.

Also suitable as monomers (a2) are ethoxylated and/or propoxylated allyl alcohol, which is sold by Arco Chemicals, or 2-hydroxyalkyl allyl ethers, especially 2-hydroxyethyl allyl ether. Where used, they are preferably employed not as sole monomers (a2) but in an amount of from 0.1 to 10% by weight, based on the (meth)acrylate copolymer (A).

Also suitable are reaction products of the olefinically unsaturated acids listed above, especially acrylic acid and/or methacrylic acid, with the glycidyl ester of an alpha-branched monocarboxylic acid having from 5 to 18 carbon atoms per molecule, in particular a Versatic® acid, or, instead of the reaction products, an equivalent amount of the abovementioned olefinically unsaturated acids, especially acrylic acid and/or methacrylic acid, which is then reacted, during or after the polymerization reaction, with the glycidyl ester of an alpha-branched monocarboxylic acid having from 5 to 18 carbon atoms per molecule, in particular a Versatic® acid (cf. Römpp Lexikon Lacke und Druckfarben, Georg Thieme Verlag, Stuttgart, N.Y., 1998, "Versatic® acids", pages 605 and 606).

Not least, acryloyloxysilane-containing vinyl monomers are suitable as monomers (a2), being preparable by reacting hydroxy-functional silanes with epichloro-hydrin and then reacting that reaction product with (meth)acrylic acid and/or with hydroxyalkyl and/or hydroxycycloalkyl esters of (meth) acrylic acid and/or other hydroxyl-containing monomers (a1) and (a2).

Besides the hydroxyl groups, the (meth)acrylate copolymers may contain on average per molecule
(i) at least one, in particular at least two, reactive functional group(s) which are able to undergo thermally initiated crosslinking reactions with complementary reactive functional groups, and/or
(ii) at least one, in particular at least two, reactive functional group(s) having at least one, especially one, bond which can be activated with actinic radiation.

Examples of suitable complementary reactive functional groups for use in accordance with the invention are compiled in the following overview. In the overview, the variable R stands for an acyclic or cyclic aliphatic radical, an aromatic radical and/or aromatic-aliphatic (araliphatic) radical; the variables R' and R" stand for identical or different aliphatic radicals or are linked with one another to form an aliphatic or heteroaliphatic ring.

| Overview: Examples of complementary reactive functional groups | | |
|---|---|---|
| Binder | and or | crosslinking agent |
| Crosslinking agent | and | binder |
| —SH | | —C(O)—OH |
| —$NH_2$ | | —C(O)—O—C(O)— |
| —O—(CO)—NH—(CO)—$NH_2$ | | —NCO |
| —O—(CO)—$NH_2$ | | —NH—C(O)—OR |
| >NH | | —$CH_2$—OH |
| | | —$CH_2$—O—R |
| | | —NH—$CH_2$—O—R |
| | | —NH—$CH_2$—OH |
| | | —N(—$CH_2$—O—R$)_2$ |
| | | —NH—C(O)—CH(—C(O)OR$)_2$ |
| | | —NH—C(O)—CH(—C(O)OR)(—C(O)—R) |
| | | —NH—C(O)—NR'R" |
| | | >Si(OR$)_2$ |
| | | —CH—$CH_2$ (epoxide) |
| | | —CH—$CH_2$ (cyclic carbonate) |
| —C(O)—OH | | —CH—$CH_2$ (epoxide) |
| | | —C(O)-N($CH_2$—$CH_2$—OH$)_2$ |

The selection of the respective complementary reactive functional groups is guided on the one hand by the consideration that during the preparation of the binder (A) and during the preparation, the storage, the application, and the curing process they should not enter into any unwanted reactions, in particular no premature crosslinking, and/or should not disrupt or inhibit the actinic radiation cure, and secondly by the temperature range within which crosslinking is to take place.

Preferably, the complementary reactive functional groups (i) are selected on the one hand from the group consisting of thiol, amino, N-methylolamino, N-alkoxy-methylamino, imino, carbamate, allophanate and/or carboxyl groups and on the other hand from the group consisting of anhydride, carboxyl, epoxy, blocked and unblocked isocyanate, urethane, alkoxycarbonylamino, methylol, methylol ether, carbonate, amino and/or beta-hydroxyalkylamide groups.

Self-crosslinking binders (A) contain, in particular, methylol, methylol ether and/or N-alkoxymethylamino groups (i).

The complementary reactive functional groups may be introduced into the (meth)acrylate copolymers with the aid of the olefinically unsaturated monomers (a3) described below, which contain the reactive functional groups in question, or by means of polymer-analogous reactions.

Examples of suitable olefinically unsaturated monomers (a3) are
(a31) monomers which carry per molecule at least one amino group, such as
aminoethyl acrylate, aminoethyl methacrylate, allylamine or N-methylaminoethyl acrylate; and/or
(a32) monomers which carry per molecule at least one acid group, such as
acrylic acid, beta-carboxyethyl acrylate, methacrylic acid, ethacrylic acid, crotonic acid, malic acid, fumaric acid or itaconic acid;
olefinically unsaturated sulfonic or phosphonic acids or their partial esters;
mono(meth)acryloyloxyethyl maleate, succinate or phthalate; or
vinylbenzoic acid (all isomers), alpha-methylvinylbenzoic acid (all isomers) or vinylbenzenesulfonic acid (all isomers).
(a33) Monomers containing epoxide groups, such as the glycidyl ester of acrylic acid, methacrylic acid, ethacrylic acid, crotonic acid, malic acid, fumaric acid or itaconic acid, or allyl glycidyl ether.

One example of introducing reactive functional groups by way of polymer-analogous reactions is the reaction of some of the hydroxyl groups present in the binder (A) with phosgene, to give resins containing chloroformate groups, and the polymer-analogous reaction of the chloroformate-functional resins with ammonia and/or primary and/or secondary amines to give binders (A) containing carbamate groups. Further examples of suitable methods of this kind are known from the patents U.S. Pat. Nos. 4,758,632 A1, 4,301,257 A1 and 2,979,514 A1. It is possible, moreover, to introduce carboxyl groups by the polymer-analogous reaction of some of the hydroxyl groups with carboxylic anhydrides, such as malic anhydride or phthalic anhydride.

Furthermore, the (meth)acrylate copolymers (A) may also contain at least one olefinically unsaturated monomer (a4), which is substantially or entirely free from reactive functional groups, such as:
Monomers (a41):
Substantially acid-group-free (meth)acrylic esters such as (meth)acrylic acid alkyl or cycloalkyl esters having up to 20 carbon atoms in the alkyl radical, especially methyl, ethyl, n-propyl, n-butyl, sec-butyl, tert-butyl, hexyl, ethylhexyl, stearyl and lauryl acrylate, or lauryl methacrylate; cycloaliphatic (meth)acrylic esters, especially cyclohexyl, isobornyl, dicyclo-pentadienyl, octahydro-4,7-methano-1H-indenemethanol or tert-butylcyclohexyl (meth)acrylate; (meth)acrylic acid oxaalkyl esters or oxacycloalkyl esters such as ethoxytriglycol (meth)acrylate and methoxyoligoglycol (meth)acrylate having a molecular weight Mn of preferably 550 or other ethoxylated and/or propoxylated, hydroxyl-free (meth)acrylic acid derivatives (further examples of suitable monomers (31) of this kind are known from the laid-open specification DE 196 25 773 A1, column 3 line 65 to column 4 line 20). They may contain minor amounts of (meth)acrylic acid alkyl or cycloalkyl esters of higher functionality, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. In the context of the present invention, minor amounts of monomers (a41) of higher functionality are amounts which do not lead to crosslinking or gelling of the copolymers, except where the intention is that they should be in the form of crosslinked microgel particles.

Monomers (a42):
Vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may include both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are propylene trimer, propylene tretramer, and diisobutylene, for example. The vinyl esters may, however, also be prepared conventionally from the acids, for example, by reacting the acid with acetylene. Particular preference—owing to their ready availability—is given to using vinyl esters of saturated aliphatic monocarboxylic acids having from 9 to 11 carbon atoms and being branched on the alpha carbon atom. Vinyl esters of this kind are sold under the brand name VeoVa® (cf. also Römpp Lexikon Lacke und Druckfarben, Georg Thieme Verlag, Stuttgart, N.Y., 1998, page 598).

Monomers (a43):
Diarylethylenes, especially those of the general formula I:

$$R^1R^2C=CR^3R^4 \qquad (I),$$

in which the radicals $R^1$, $R^2$, $R^3$ and $R^4$, in each case independently of one another, stand for hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ stand for substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, iso-butyl, tert-butyl, amyl, hexyl and 2-ethylhexyl. Examples of suitable cycloalkyl radicals are cyclobutyl, cyclopentyl and cyclohexyl. Examples of suitable alkylcycloalkyl radicals are methylenecyclohexane, ethylenecyclohexane, and propane-1,3-diylcyclohexane. Examples of suitable cycloalkyl-alkyl radicals are 2-, 3- or 4-methyl-, -ethyl-, -propyl- and -butylcyclohex-1-yl. Examples of suitable aryl radicals are phenyl, naphthyl, and biphenylyl, preferably phenyl and naphthyl, and especially phenyl.

Examples of suitable alkylaryl radicals are benzyl and ethylene- or propane-1,3-diylbenzene. Examples of suitable cycloalkylaryl radicals are 2-, 3-, and 4-phenylcyclohex-1-yl. Examples of suitable arylalkyl radicals are 2-, 3- and 4-methyl-, -ethyl-, -propyl-, and -butylphen-1-yl. Examples of suitable arylcycloalkyl radicals are 2-, 3-, and 4-cyclohexylphen-1-yl. The aryl radicals $R^1$, $R^2$, $R^3$ and/or $R^4$ are preferably phenyl or naphthyl radicals, especially phenyl radicals.

The substituents that may be present in the radicals $R^1$, $R^2$, $R^3$ and/or $R^4$ are electron-withdrawing or electron-donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl, and arylcycloalkyl radicals; aryloxy, alkyloxy and cycloalkyloxy radicals; and/or arylthio, alkylthio and cycloalkylthio radicals. Particularly advantageous are diphenylethylene, dinaphthaleneethylene, cis- or trans-stilbene or vinylidenebis(4-nitrobenzene), especially diphenylethylene (DPE), and so are used with preference. In the context of the present invention the monomers (a33) are used in order to regulate the copolymerization advantageously in such a way that free-radical copolymerization in batch mode is also possible.

Monomers (a44):

Vinylaromatic hydrocarbons such as styrene, vinyl-toluene, diphenylethylene or alpha-alkylstyrenes, especially alpha-methylstyrene.

Monomers (a45):

Nitriles such as acrylonitrile and/or methacrylonitrile.

Monomers (a46)

Vinyl compounds, especially vinyl and/or vinylidene dihalides such as vinyl chloride, vinyl fluoride, vinylidene dichloride or vinylidene difluoride; N-vinylamides such as vinyl-N-methylformamide, N-vinylcaprolactam or N-vinylpyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinylcyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (a47):

Allyl compounds, especially allyl ethers and allyl esters such as allyl methyl, ethyl, propyl or butyl ether or allyl acetate, propionate or butyrate.

Monomers (a48):

Polysiloxane macromonomers which have a number-average molecular weight Mn of from 1 000 to 40 000 and contain on average from 0.5 to 2.5 ethylenically unsaturated double bonds per molecule; especially polysiloxane macromonomers which have a number-average molecular weight Mn of from 2 000 to 20 000, with particular preference from 2 500 to 10 000, and in particular from 3 000 to 7 000, and contain on average per molecule from 0.5 to 2.5, preferably from 0.5 to 1.5, ethylenically unsaturated double bonds, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12 line 18 to page 18 line 10.

The monomers (a1) and (a2) and also (a3) and/or (a4) are selected so as to give the OH numbers and glass transition temperatures indicated above. Furthermore, the monomers (a3) containing reactive functional groups are selected in their nature and amount such that they do not inhibit, or prevent entirely, the crosslinking reactions of the hydroxyl groups with the compounds (B) described below.

For adjusting the glass transition temperatures, the skilled worker may select the monomers (a) with the assistance of the following formula of Fox, with which the glass transition temperatures of poly(meth)acrylates may be calculated approximately:

$$1/Tg = \sum_{n=1}^{n=x} W_n/Tg_n; \sum_n W_n = 1$$

Tg=glass transition temperature of the poly(meth)acrylate;
$W_n$=weight fraction of the nth monomer;
$Tg_n$=glass transition temperature of the homopolymer of the nth monomer; and
x=number of different monomers.

The preparation of the (meth)acrylate copolymers (A) for use in accordance with the invention has no special features in terms of its process technology but instead takes place with the aid of the methods of continuous or batchwise, free-radically initiated copolymerization that are customary and known in the polymers field, in bulk, solution, emulsion, miniemulsion or micro-emulsion, under atmospheric pressure or super-atmospheric pressure, in stirred tanks, autoclaves, tube reactors, loop reactors or Taylor reactors, at temperatures of preferably from 50 to 200° C.

Examples of suitable copolymerization processes are described in the patent applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387 and WO 98/02466. Alternatively, the copolymerization may be conducted in the polyols as the reaction medium, as is described, for example, in the German patent application DE 198 50 243 A1.

Examples of suitable free-radical initiators are dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azo dinitriles such as azobisiso-butyronitrile; C-C-cleaving initiators such as benzpinacol silyl ethers; or a combination of a non-oxidizing initiator with hydrogen peroxide. Combinations of the above-described initiators may also be used.

Further examples of suitable initiators are described in the German patent application DE 196 28 142 A1, page 3 line 49 to page 4 line 6.

It is preferred to add comparatively large amounts of free-radical initiator, with the fraction of the initiator in the reaction mixture, based in each case on the overall amount of the monomers (a) and of the initiator, being with particular preference from 0.2 to 20% by weight, with very particular preference from 0.5 to 15% by weight, and in particular from 1.0 to 10% by weight.

It is also possible to use thiocarbonylthio compounds or mercaptans such as dodecyl mercaptan as chain transfer agents or molecular weight regulators.

The nature and amount of the (meth)acrylate copolymers (A) are preferably selected in such a way that, following their curing, the dual-cure coating materials of the invention have a storage modulus E' in the rubber-elastic range of at least $10^{7.5}$ Pa and a loss factor tanδ at 20° C. at not more than 0.10, the storage modulus E' and the loss factor having been measured by dynamic mechanical thermoanalysis on free films with a thickness of 40±10 μm (cf. in this respect the German patent DE 197 09 467 C2).

The reactive functional groups having at least one bond which can be activated with actinic radiation may be present in the (meth)acrylate copolymers (A). Where the coating materials for use in accordance with the invention include no other constituents which can be cured with actinic radiation, the (meth)acrylate copolymers (A) mandatorily contain these groups.

In the context of the present invention, a bond which can be activated with actinic radiation is a bond which, on exposure to actinic radiation, becomes reactive and, together with other activated bonds of this kind, undergoes polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the inventively preferred group contains one double bond or two, three or four double bonds. Where more than one double bond is used, the double bonds may be conjugated. In accordance with the invention, however, it is of advantage if the double bonds are present in isolation, in particular each terminally, in the group in question. It is of particular advantage in accordance with the invention to use two double bonds or, in particular, one double bond.

The dual-cure binder (A) contains on average at least one of the above-described groups which can be activated with actinic radiation. This means that the functionality of the binder in this respect is integral, i.e., for example, is equal to two, three, four, five or more, or is nonintegral, i.e., is equal for example to from 2.1 to 10.5 or more.

Where on average per molecule more than one group which can be activated with actinic radiation is employed, the groups are structurally different from one another or of the same structure.

Where they are structurally different from one another, this means in the context of the present invention that two, three, four or more, but especially two, groups which can be activated with actinic radiation are used which derive from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially acrylate groups.

The groups are attached to respective parent structures of the binders preferably by way of urethane, urea, allophanate, ester, ether and/or amide groups, but in particular by way of ester groups. Normally this is effected by customary and known polymer-analogous reactions such as, for instance, the reaction of pendent glycidyl groups with the above-described olefinic unsaturated monomers containing an acid group, of pendent hydroxyl groups with the halides of these monomers, of hydroxyl groups with isocyanates containing double bonds, such as vinyl isocyanate, methacryloyl isocyanate and/or 1-(1-isocyanato-1-methylethyl)-3-(1-methylethenyl) benzene (TMI® from CYTEC), or of isocyanate groups with the above-described hydroxyl-containing monomers.

The amount of the binders (A) in the coating materials for use in accordance with the invention may vary widely and is guided primarily by the functionality of the binders (A), on the one hand, and of the compounds (C), present if desired and described below, on the other. The amount, based on the solids of the coating material for use in accordance with the invention, is preferably from 20 to 99.8%, more preferably from 25 to 95%, with particular preference from 30 to 90%, with very particular preference from 35 to 85%, and in particular from 40 to 80% by weight.

The coating materials for use in accordance with the invention comprise at least one photoinitiator, preferably at least two and in particular three photo-initiators (B), in an amount from 0.2 to 8%, preferably from 0.3 to 6%, more preferably from 0.4 to 4%, with particular preference from 0.5 to 2%, and in particular from 0.8 to 1.5% by weight, based in each case on the solids of the coating material of the invention.

Examples of suitable photoinitiators (B) are described in Römpp Lexikon Lacke und Druckfarben, Georg Thieme Verlag, Stuttgart, N.Y., 1998, pages 444 to 446.

Photoinitiators are commercially customary compounds and are sold, for example, by BASF Aktiengesellschaft under the brand name LUCIRIN, by Ciba Specialty Chemicals under the brand name IRGACURE, and by Rahn under the brand name GENOCURE.

Preferably, the dual-cure coating material for use in accordance with the invention further comprises at least one constituent selected from the group consisting of low molecular mass, oligomeric and polymeric compounds (C) other than the (meth)acrylate copolymers (A), which contain on average per molecule (i) at least one, preferably at least two, of the above-described reactive functional groups which are able to undergo thermally initiated cross-linking reactions with complementary reactive functional groups, especially hydroxyl groups, and/or (ii) at least one, preferably at least two, of the above-described reactive functional groups having at least one bond which can be activated with actinic radiation.

Where the above-described (meth)acrylate copolymer (A) contains none of the above-described, self-crosslinking reactive functional groups, the dual-cure coating material for use in accordance with the invention mandatorily comprises at least one, especially one, low molecular mass, oligomeric and/or polymeric compound (C), in particular a low molecular mass or oligomeric compound (C), which has reactive functional groups (i) which are able to undergo thermally initiated crosslinking reactions with hydroxyl groups. Suitable compounds (C) of this kind are customary and known crosslinking agents, such as are known, for example, from the German patent application DE 199 24 171 A1, page 7 line 38 to page 8 line 46 in conjunction with page 3 line 43 to page 5 line 31. Preference is given to employing blocked, part-blocked or unblocked polyisocyanates.

Where the above-described (meth)acrylate copolymer (A) contains none of the above-described reactive functional groups (ii) having at least one bond which can be activated with actinic radiation, the dual-cure coating material for use in accordance with the invention mandatorily comprises at least one low molecular mass, oligomeric and/or polymeric compound (C) containing at least one, preferably at least two, more preferably at least three, with particular preference at least four, and in particular at least five, reactive functional groups (ii).

Examples of suitable low molecular mass, oligomeric and/or polymeric compounds (C) containing at least one group (ii) are described in detail in Römpp Lexikon Lacke und Druckfarben, Georg Thieme Verlag, Stuttgart, N.Y., 1998, "reactive diluents", pages 491 and 492, in the German patent application DE 199 08 013 A1, column 6 line 63 to column 8 line 65, in the German patent application DE 199 08 018 A1, page 11 lines 31 to 33, in the German patent application DE 198 18 735 A1, column 7 lines 1 to 35, or in the German patent DE 197 09 467 C1, page 4 line 36 to page 5 line 56. Preference is given to using pentaerythritol tetraacrylate, dipentaerythritol pentaacrylate, and/or aliphatic urethane acrylates containing six acrylate groups in the molecule.

Instead of or in addition to the compounds (C) described above, the dual-cure coating material for use in accordance with the invention may contain at least one, in particular at least two, low molecular mass, oligomeric and/or polymeric compound(s) (C) containing at least one, especially at least two, group(s) (i) and at least one, in particular at least two, group(s) (ii). Examples of suitable compounds (C) of this kind are described in detail in the European patent application EP 0 928 800 A1, page 3 lines 17 to 54 and page 4 lines 41 to 54, or in the German patent application DE 198 18 735 A1, column 3 line 16 to column 6 line 33. It is preferred to use isocyanato acrylates, which are preparable from polyisocyanates and the above-described hydroxyl-containing monomers (a1) and/or (a2).

Furthermore, the dual-cure coating material for use in accordance with the invention may comprise at least one additive (D) selected from the group consisting of binders other than the binders (A) and curable physically or by means of heat alone; thermally curable reactive diluents; molecularly dispersely soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermal crosslinking catalysts; thermolabile free-radical initiators; adhesion promoters; leveling agents; film formation auxiliaries; rheological aids, such as thickeners and pseudoplastic sag control agents, SCAs; flame retardants; corrosion inhibitors; free-flow aids; waxes; siccatives; biocides, and flatting agents.

Examples of suitable additives (D) are described in detail in the textbook "Lackadditive" [Additives for coatings] by Johan Bieleman, Wiley-VCH, Weinheim, N.Y., 1998, in D. Stoye and W. Freitag (editors), "Paints, Coatings and Solvents", second, completely revised edition, Wiley-VCH, Weinheim, N.Y., 1998, "14.9. solvent groups", pages 327 to 373, in the German patent application DE 199 14 896 A1, column 14 line 26 to column 15 line 46, or in the German patent application DE 199 08 018 A1, page 9 line 31 to page 8 line 30. For further details, refer to the German patent applications DE 199 04 317 A1 and DE 198 55 125 A1.

The dual-cure coating materials used in accordance with the invention that comprise the above-described constituents (A) and (B) and also, where appropriate, (C) and/or (D) are used, in the context of the process of the invention, in particular as clearcoat materials for producing clearcoats.

The pigmented dual-cure coating materials for use in accordance with the invention further comprise at least one pigment (E), selected from the group consisting of organic and inorganic, transparent and hiding, color and/or effect, electrically conductive, magnetically shielding, and fluorescent pigments, fillers, and nanoparticles.

In the context of the process of the invention, the pigmented dual-cure coating materials for use in accordance with the invention are employed in particular as primer-surfacers, basecoat materials and solid-color topcoat materials for producing primer-surfacer coats or antistonechip primer coats, basecoats, and solid-color topcoats.

Where exclusively nonhiding, transparent pigments (E), especially nanoparticles (E), are used, the pigmented dual-cure coating materials for use in accordance with the invention may also be used as clearcoat materials.

In terms of its method, the preparation of the dual-cure coating materials for use in accordance with the invention has no special features but instead takes place by the mixing and homogenizing of the above-described constituents using customary and known mixing techniques and equipment such as stirred vessels, stirred mills, extruders, kneaders, Ultraturrax, inline dissolvers, static mixers, toothed-ring dispersers, pressure release nozzles and/or microfluidizers, preferably in the absence of actinic radiation.

The resulting dual-cure coating materials for use in accordance with the invention are conventional coating materials, containing organic solvents, aqueous coating materials, substantially or fully solvent-free and water-free liquid coating materials (100% systems), substantially or fully solvent-free and water-free solid coating materials (powder coating materials), or substantially or fully solvent-free powder coating suspensions (powder slurries). Moreover, they may be one-component systems, in which the binders (A) and the crosslinking agents (C) are present alongside one another, or two-component or multicomponent systems, in which the binders (A) and the crosslinking agents (C) are present separately from one another until shortly before application.

The coatings of the invention produced by the process of the invention, especially the single-coat or multicoat color and/or effect paint systems and clearcoats of the invention, are easy to produce and have outstanding optical properties and very high light stability, chemical resistance, water resistance, condensation resistance, weathering stability, and etch resistance. In particular, they are free from turbidities and inhomogeneities. They have very good reflow properties and combine outstanding scratch resistance with high hardness. Particularly noteworthy points are their outstanding yellowing resistance and overbake stability.

A further advantage of the process of the invention is that the dual-cure coating materials for use in accordance with the invention, even in the shadow zones of the three-dimensional substrates of complex shape, such as vehicle bodies, radiators or electrical wound goods, and even without optimum—in particular, complete—illumination of the shadow zones with actinic radiation, give coatings whose profile performance properties at least approached that of the coatings outside of the shadow zones. As a result, the coatings present within the shadow zones are also no longer easily damaged by mechanical and/or chemical attack, as may occur, for example, in the line during the installation of further motor vehicle components into the coated bodies.

Accordingly, the primed or unprimed substrates commonly employed in the technological fields recited above and now coated with at least one coating of the invention combine a particularly advantageous profile of performance properties with a particularly long service life, so making them particularly attractive from both an economic and an environmental standpoint.

INVENTIVE AND COMPARATIVE EXAMPLES

Preparation Example 1

The Preparation of a Methacrylate Copolymer (A)

In an appropriate reactor equipped with a stirrer, two dropping funnels for the monomer mixture and the initiator solution, a nitrogen inlet pipe, thermometer, heating system, and reflux condenser, 650 parts by weight of an aromatic hydrocarbon fraction with a boiling range from 158 to 172° C. were weighed in. The solvent was heated to 140° C. Thereafter a monomer mixture of 652 parts by weight of ethylhexyl acrylate, 383 parts by weight of 2-hydroxyethyl methacrylate, 143 parts by weight of styrene, 212 parts by weight of 4-hydroxybutyl acrylate and 21 parts by weight of acrylic acid was metered into the initial charge at a uniform rate over the course of four hours and an initiator solution of 113 parts by weight of the aromatic solvent and 113 parts by weight of tert-butyl perethylhexanoate was metered into the initial charge at a uniform rate over the course of 4.5 hours. The addition of the monomer mixture and of the initiator solution was commenced simultaneously. After the end of the initiator feed, the resulting reaction mixture was heated at 140° C. for two hours more, with stirring, and was then cooled. The resulting solution of the methacrylate copolymer (A) was diluted with a mixture of 1-methoxypropyl 2-acetate, butyl glycol acetate and butyl acetate.

The resulting solution had a solids content of 65% by weight, determined in a forced air oven (one hour/130° C.), an acid number of 15 mg KOH/g solids, an OH number of 175 mg KOH/g solids, and a glass transition temperature of −21° C.

Preparation Examples 2 to 4

The Preparation of Clearcoat Materials for Inventive Use

The clearcoat materials were prepared by mixing the constituents indicated in the table, in the stated order, and homogenizing the resulting mixture.

TABLE

The material composition of the clearcoat materials

| Constituent | Parts by weight Preparation example: | | |
|---|---|---|---|
| | 2 | 3 | 4 |
| Stock varnish: | | | |
| Methacrylate copolymer from preparation example 1 | 35.9 | 35.9 | 35.9 |
| Dipentaerythritol pentaacrylate | 20 | 20 | 20 |
| UV absorber (substituted hydroxyphenyltriazine) | 1.0 | 1.0 | 1.0 |
| HALS (N-methyl-2,2,6,6-tetramethyl-piperidinyl ester) | 1.0 | 1.0 | 1.0 |
| Wetting agent (Byk ® 306 from Byk Chemie) | 0.4 | 0.4 | 0.4 |
| Butyl acetate | 27.4 | 27.4 | 27.4 |
| Solventnaphtha ® | 10.8 | 12.6 | 13.3 |
| Irgacure ® 184 (commercial photoinitiator from Ciba Specialty Chemicals) | 2.0 | 1.0 | — |
| Genocure ® MBF (commercial photoinitiator from Rahn) | 1.0 | 0.5 | — |
| Lucirin ® TPO (commercial photoinitiator from BASF AG) | 0.5 | 0.2 | 1.0 |
| Total: | 100 | 100 | 100 |

Crosslinking Component (C):

| Crosslinking agent (C 1): | | | |
|---|---|---|---|
| Isocyanato acrylate Roskydal ® UA VPLS 2337 from Bayer AG (basis: trimeric hexamethylene diisocyanate; isocyanate group content: 12% by weight) | 27.84 | 27.84 | 27.84 |
| Crosslinking agent (C 2): | | | |
| Isocyanato acrylate based on the trimer of isophorone diisocyanate (70.5% in butyl acetate; viscosity: 1 500 mPas; isocyanategroup content: 6.7% by weight; prepared analogously to example 1 of EP 0 928 800 A1) | 6.96 | 6.96 | 6.96 |
| Diluent | 3.48 | 3.48 | 3.48 |
| Total: | 38.28 | 38.28 | 38.28 |

The clearcoat materials had a very good pot life and very good application properties.

Inventive Examples 1 to 4

The Production of Inventive Multicoat Paint Systems with the Aid of the Inventive Process For inventive example 1, the clearcoat material from preparation example 2 was used.

For inventive examples 2 and 3, the clearcoat material from preparation example 3 was used.

For inventive example 4, the clearcoat material from preparation example 4 was used.

To produce the inventive multicoat paint systems, steel panels were coated in succession with an electrocoat, deposited cathodically and baked at 170° C. for 20 minutes, with a dry film thickness from 18 to 22 μm.

The steel panels were then coated with a commercial two-component waterborne primer-surfacer from BASF Coatings AG, as is commonly used for plastics substrates. The resulting primer-surfacer film was baked at 90° C. for 30 minutes so as to give a dry film thickness of from 35 to 40 μm. Thereafter a commercial black aqueous basecoat material from BASF Coatings AG was applied with a film thickness of from 12 to 15 μm, after which the resulting aqueous basecoat films were flashed off at 80° C. for ten minutes. The clearcoat materials were then applied pneumatically using a gravity-feed cup gun in one cross pass, with a film thickness of from 40 to 45 μm. The aqueous basecoat films and the clearcoat films were cured at room temperature for 5 minutes, at 80° C. for 10 minutes, followed by exposure to UV light in a dose of 1 500 mJ/cm$^2$, and finally at 140° C. for 20 minutes.

For inventive examples 1 to 4, irradiation was carried out using oxygen-depleted atmospheres having different oxygen contents:
Example 1: air/nitrogen with 20% by volume oxygen;
Example 2: air/nitrogen with 14% by volume oxygen;
Example 3: air/nitrogen with 9% by volume oxygen; and
Example 4: air/nitrogen with 5% by volume oxygen.

The inventive multicoat paint systems of inventive examples 1 to 4 had an outstanding profile of properties.

They were very bright and had a gloss (20°) to DIN 67530 of 90.5. The micropenetration hardness (universal hardness at 25.6 mN, Fischerscope 100V with Vickers diamond pyramid) was 138.1.

The scratch resistance was assessed using the sand test (cf. the German patent application DE 198 39 453 A1, page 9 lines 1 to 63) on the basis of the metal test panels described above. The loss of gloss after damage was significantly reduced by the oxygen depletion:
Example 1: loss of gloss: 10 units (20°);
Example 2: loss of gloss: 7 units (20°);
Example 3: loss of gloss: 5 units (20°); and
Example 4: loss of gloss: 3.5 units (20°).

The scratch resistance was also assessed using the brush test (cf. the German patent application DE 198 39 453 A1, page 9 lines 17 to 63) on the basis of the metal test panels described above. Here again, the loss of gloss after damage was significantly reduced by the oxygen depletion:
Example 1: loss of gloss: 4 units (20°);
Example 2: loss of gloss: 3 units (20°);

Example 3: loss of gloss: 2.5 units (20°); and
Example 4: loss of gloss: 1.5 units (20°).

In the DaimlerChrysler gradient oven test, which is known to those in the art, initial damage to the inventive multicoat paint systems by sulfuric acid was evident only above a temperature of 53° C., and that caused by tree resin only above 55° Celsius. The edge resistance was also outstanding.

Inventive Example 5

The Production of Inventive Multicoat Paint Systems with the Aid of the Inventive Process For inventive example 5, the clearcoat material from preparation example 4 was used.

Example 4 was repeated except that instead of the black aqueous basecoat material a white aqueous basecoat material was used.

The resulting multicoat paint system was subjected to colorimetry. After baking it had a b value (cf. Römpp Lexikon Lacke und Druckfarben, Stuttgart, N.Y., 1998, "CIELAB color distance formula", pages 114 and 115) of only 1.1. The b value remained constant after a week of storage in the dark. After one week's roof placement with a high sunlight fraction, the b value had fallen only by 0.18 of a unit, underscoring the high shade stability.

Even after overbaking of the freshly painted test panels at 185° C. for 30 minutes, the b value had risen only by 4 units, which demonstrated the high overbake stability.

After 3 000 h of accelerated weathering in the CAM 180 test, which is known to those in the art and standard in the automobile industry, the b value had risen only by 0.1 of a unit, which again confirmed the high shade stability and yellowing resistance.

What is claimed is:

1. A process for producing a clearcoat coatings for a motor vehicle body or part thereof from a coating materials that is curable thermally and with electromagnetic actinic radiation comprising
   (I) applying the coating materials to a substrate of a motor vehicle body or part thereof, wherein the substrate optionally has at least one film thereon, wherein the at least one film is uncured or at least partially-cured, and
   (II) curing the coating materials thermally and with electromagnetic actinic radiation, employing a dose of 1 000 to 2 900 mJ/cm$^2$, alone or together with the optional at least one film that is uncured or partially-cured,
   wherein
   (1) the electromagnetic actinic radiation curing is conducted under an oxygen-depleted atmosphere having an oxygen content of at least 2.0% by volume and not more than 14% by volume, and
   (2) the coating material comprises
      (A) at least one binder comprising a (meth)acrylate copolymer having an OH number of from 100 to 220 mg KOH/g, a glass transition temperature of −35 to +60° C., a number-average molecular weight of from 1,000 to 10,000 daltons and a mass-average molecular weight of from 2,000 to 40,000 daltons and which contain in copolymerized form an amount of a hydroxyl-containing olefinically unsaturated monomer that corresponds to the OH number, of which
         (a1) from 20 to 90% by weight, based on the hydroxyl-containing monomer, are selected from the group consisting of 4-hydroxybutyl(meth)-acrylate, 2-methyl-1,3-diol mono(meth)acrylate, 2-ethyl-1,3-diol mono(meth)acrylate, 2-propyl-1,3-diol mono(meth)acrylate, 2-isopropyl-1,3-diol mono(meth)acrylate, 2-n-butylpropane-1,3-diol-mono(meth)acrylate, and combinations thereof, and
         (a2) from 10 to 80% by weight, based on the hydroxyl-containing monomer, comprise at least one other hydroxyl-containing olefinically unsaturated monomer selected from the group consisting of hydroxyalkyl esters of olefinically unsaturated carboxylic acids, hydroxyalkyl esters of olefinically unsaturated sulfonic acids, hydroxyalkyl esters of olefinically unsaturated phosphonic acids, acidic phosphoric esters, acidic sulfuric esters, allyl alcohol, ethoxylated allyl alcohol, propoxylated allyl alcohol, reaction products of olefinically unsaturated carboxylic acids with a glycidyl ester of an alpha-branched monocarboxylic acid having from 5 to 18 carbon atoms in the molecule, reaction products of olefinically unsaturated sulfonic acids with a glycidyl ester of an alpha-branched monocarboxylic acid having from 5 to 18 carbon atoms in the molecule, reaction products of olefinically unsaturated phosphonic acids with a glycidyl ester of an alpha-branched monocarboxylic acid having from 5 to 18 carbon atoms in the molecule, reaction products of olefinically unsaturated acidic phosphoric esters with a glycidyl ester of an alpha-branched monocarboxylic acid having from 5 to 18 carbon atoms in the molecule, reaction products of olefinically unsaturated sulfuric esters with a glycidyl ester of an alpha-branched monocarboxylic acid having from 5 to 18 carbon atoms in the molecule, and combinations thereof;
and
   (B) from 0.2 to 8% by weight, based on the solids of the coating material, of at least one photoinitiator;
   (C) at least one constituent selected from the group consisting of low molecular mass compounds, oligomeric compounds, polymeric compounds, and combinations thereof, wherein the at least one constituent is different from the (meth)acrylate copolymer, and the at least one constituent contains on average per molecule at least one of
   (i) at least one reactive functional group that undergoes thermally initiated crosslinking reactions with a complementary reactive functional group, and
   ii) at least one reactive functional group having at least one bond that can be activated with electromagnetic actinic radiation;
   wherein the complementary reactive functional group (i) is selected from the group consisting of thiol groups, amino groups, N-methylolamino groups, N-alkoxymethylamino groups, imino groups, carbamate groups, allophanate groups, carboxyl groups, and combinations thereof, or from the group consisting of anhydride groups, carboxyl groups, epoxy groups, blocked isocyanate groups, unblocked isocyanate groups, urethane groups, alkoxycarbonylamino groups, methylol groups, methylol ether groups, carbonate groups, amino groups, beta-hydroxyalkylamide groups, and combinations thereof;
   wherein the bonds that can be activated with electromagnetic actinic radiation comprise carbon-carbon double bonds; and
   wherein the clearcoat coating produced by the process exhibits improved scratch resistance and hardness as a result of the oxygen-depleted atmosphere and has a storage modulus E' of at least $10^{7.5}$ Pa and a loss factor tan δ at 20° C. of not more than 0.10 as measured by dynamic mechanical thermoanalysis on homogeneous free films with a thickness of 40±10 microns, and a micropenetration hardness at 25.6 mN of at least 138.1.

2. The process of claim 1, wherein the oxygen content of the oxygen-depleted atmosphere is at least about 5% by volume and not more than about 10% by volume.

3. The process of claim 1, wherein the oxygen content of the atmosphere is controlled by adding at least one inert gas.

4. The process of claim 3, wherein the inert gas is selected from the group consisting of nitrogen, carbon dioxide, helium, neon, argon, and combinations thereof.

5. The process of claim 1, wherein the at least one reactive functional group having at least one bond that can be activated with electromagnetic actinic radiation is an acrylate group.

6. The process of claim 1, wherein the coating material further comprises at least one pigment selected from the group consisting of organic pigments, inorganic pigments, transparent pigments, hiding pigments, color and/or effect pigments, electrically conductive pigments, magnetically shielding pigments, fluorescent pigments, fillers, nanoparticles, and combinations thereof.

7. The process of claim 1, wherein the electromagnetic actinic radiation is UV radiation.

8. A process for producing a coating from a coating material that is curable thermally and with actinic radiation comprising
  (I) applying the coating materials to a substrate, wherein the substrate optionally has at least one film thereon, wherein the at least one film is uncured or at least partially-cured, and
  (II) curing the coating materials thermally and with actinic radiation, alone or together with the optional at least one film that is uncured or partially-cured,
wherein
  (1) the actinic radiation curing is conducted under an oxygen-depleted atmosphere and
  (2) the coating material comprises
    (A) at least one binder comprising a (meth)acrylate copolymer having an OH number of from 100 to 220 mg KOH/g, a glass transition temperature of −35 to +60° C., a number-average molecular weight of from 1,000 to 10,000 daltons and a mass-average molecular weight of from 2,000 to 40,000 daltons and which contain in copolymerized form an amount of a hydroxyl-containing olefinically unsaturated monomer that corresponds to the OH number, of which
      (a1) from 20 to 90% by weight, based on the hydroxyl-containing monomer, comprises a 2-alkylpropane-1,3-diol mono(meth)acrylate selected from the group consisting of, of 2-methyl-1,3-diol mono(meth)acrylate, 2-ethyl-1,3-diol mono(meth)acrylate, 2-propyl-1,3-diolmono(meth)acrylate, 2-isopropyl-1,3-diol mono(meth)acrylate, 2-n-butylpropane-1,3-diol mono(meth)acrylate, and combinations thereof;
      (a2) from 10 to 80% by weight, based on the hydroxyl-containing monomer, comprise at least one other hydroxyl-containing olelinically unsaturated monomer; and
    (B) from 0.2 to 8% by weight, based on the solids of the coating material, of at least one photoinitiator.

9. The process of claim 8, wherein the 2-alkylpropane-1,3-diol mono(meth)acrylate comprises 2-methyl-1,3-diol mono(meth)acrylate.

10. A process for producing a clearcoat coating for a motor vehicle body or part thereof from a coating materials that is curable thermally and with electromagnetic actinic radiation comprising
  (I) applying the coating materials to a substrate of a motor vehicle body or part thereof, wherein the substrate optionally has at least one film thereon, wherein the at least one film is uncured or at least partially-cured, and
  (II) curing the coating materials thermally and with electromagnetic actinic radiation, employing a dose of 1 000 to 2 900 mJ/cm$^2$, alone or together with the optional at least one film that is uncured or partially-cured,
wherein
  (1) the electromagnetic actinic radiation curing is conducted under an oxygen-depleted atmosphere having an oxygen content of at least 2.0% by volume and not more than 10.0% by volume, and
  (2) the coating material comprises
    (A) at least one binder comprising a (meth)acrylate copolymer having an OH number of from 100 to 220 mg KOH/g, a glass transition temperature of −35 to +60° C., a number-average molecular weight of from 1,000 to 10,000 daltons and a mass-average molecular weight of from 2,000 to 40,000 daltons and which contain in copolymerized form an amount of a hydroxyl-containing olefinically unsaturated monomer that corresponds to the OH number, of which
      (a1) from 20 to 90% by weight, based on the hydroxyl-containing monomer, are selected from the group consisting of 4-hydroxybutyl (meth)acrylate, 2-methyl-1,3-diol mono(meth)acrylate, 2-ethyl-1,3-diol mono(meth)acrylate, 2-propyl-1,3-diol mono(meth) acrylate, 2-isopropyl-1,3-diol mono(meth)acrylate, 2-n-butylpropane-1,3-diol mono(meth)acrylate, and combinations thereof, and
      (a2) from 10 to 80% by weight, based on the hydroxyl-containing monomer, comprise at least one other hydroxyl-containing olefinically unsaturated monomer selected from the group consisting of hydroxyalkyl esters of olefinically unsaturated carboxylic acids, hydroxyalkyl esters of olefinically unsaturated sulfonic acids, hydroxyalkyl esters of olefinically unsaturated phosphonic acids, acidic phosphoric esters, acidic sulfuric esters, allyl alcohol, ethoxylated allyl alcohol, propoxylated allyl alcohol, reaction products of olefinically unsaturated carboxylic acids with a glycidyl ester of an alpha-branched monocarboxylic acid having from 5 to 18 carbon atoms in the molecule, reaction products of olefinically unsaturated sulfonic acids with a glycidyl ester of an alpha-branched monocarboxylic acid having from 5 to 18 carbon atoms in the molecule, reaction products of olefinically unsaturated phosphonic acids with a glycidyl ester of an alpha-branched monocarboxylic acid having from 5 to 18 carbon atoms in the molecule, reaction products of olefinically unsaturated acidic phosphoric esters with a glycidyl ester of an alpha-branched monocarboxylic acid having from 5 to 18 carbon atoms in the molecule, reaction products of olefinically unsaturated sulfuric esters with a glycidyl ester of an alpha-branched monocarboxylic acid having from 5 to 18 carbon atoms in the molecule, and combinations thereof; and (B) from 0.2 to 8% by weight, based on the solids of the coating material, of at least one photoinitiator;

(C) at least two constituents selected from the group consisting of low molecular mass compounds, oligomeric compounds, polymeric compounds, and combinations thereof, wherein the at least two constituents are different from the (meth)acrylate copolymer, wherein (i) at least one constituent contains on average per molecule at least one reactive functional group that undergoes thermally initiated crosslinking reactions with a complementary reactive functional group, and (ii) at least one constituent is selected from the group consisting of pentaerythritol tetraacrylate, dipentaerythritol pentaacrylate, aliphatic urethane acrylates containing six acrylate groups in the molecule, and mixtures thereof;

wherein the complementary reactive functional group (i) is selected from the group consisting of thiol groups, amino groups, N-methylolamino groups, N-alkoxymethylamino groups, imino groups, carbamate groups, allophanate groups, carboxyl groups, and combinations thereof, or from the group consisting of anhydride groups, carboxyl groups, epoxy groups, blocked isocyanate groups, unblocked isocyanate groups, urethane groups, alkoxycarbonylamino groups, methylol groups, methylol ether groups, carbonate groups, amino groups, beta-hydroxyalkylamide groups, and combinations thereof;

wherein the bonds that can be activated with electromagnetic actinic radiation comprise carbon-carbon double bonds; and wherein the clearcoat coating produced by the process exhibits improved scratch resistance and hardness as a result of the oxygen-depleted atmosphere and has a storage modulus E' of at least $10^{7.5}$ Pa and a loss factor tan δ at 20° C. of not more than 0.10 as measured by dynamic mechanical thermoanalysis on homogeneous free films with a thickness of 40±10 microns, and a micropenetration hardness at 25.6 mN of at least 138.1.

* * * * *